(12) United States Patent
Huttsell et al.

(10) Patent No.: US 7,341,277 B2
(45) Date of Patent: Mar. 11, 2008

(54) OCCUPANT SAFETY DEVICE

(75) Inventors: Benjamin J. Huttsell, Dublin, OH (US); Peter J. Cardimen, Powell, OH (US); Ryo Inoue, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 11/179,671

(22) Filed: Jul. 13, 2005

(65) Prior Publication Data

US 2007/0013206 A1    Jan. 18, 2007

(51) Int. Cl.
*B60R 21/04* (2006.01)

(52) U.S. Cl. ..................................... 280/751

(58) Field of Classification Search ............... 280/751; 296/189, 146.1, 146.2, 146.5, 146.6, 146.7, 296/187.12; 49/502; 52/731.6
See application file for complete search history.

(56) References Cited

U.S. PATENT DOCUMENTS

| | | | |
|---|---|---|---|
| 3,029,486 A | 4/1962 | Raymond | |
| 3,483,787 A | 12/1969 | Saunders | |
| 3,494,244 A | 2/1970 | Wayland | |
| 3,550,217 A | 12/1970 | Collyer | |
| 3,868,796 A | 3/1975 | Bush | |
| 5,124,186 A | 6/1992 | Wycech | |
| 5,344,208 A | 9/1994 | Bien et al. | |
| 5,395,135 A | 3/1995 | Lim et al. | |
| 5,482,344 A * | 1/1996 | Walker et al. | 296/39.1 |
| 5,542,738 A | 8/1996 | Walker et al. | |
| 5,573,298 A | 11/1996 | Walker et al. | |
| 5,577,794 A | 11/1996 | Gandhi et al. | |
| 5,580,119 A * | 12/1996 | Uchida et al. | 296/146.6 |
| 5,707,098 A | 1/1998 | Uchida et al. | |
| 5,749,600 A * | 5/1998 | Yamada et al. | 280/751 |
| 5,865,496 A | 2/1999 | Odan et al. | |
| 5,988,678 A | 11/1999 | Nakamura et al. | |
| 6,033,011 A | 3/2000 | Kim | |
| 6,039,387 A | 3/2000 | Choi | |
| 6,364,398 B1 | 4/2002 | Kim | |
| 6,508,035 B1 | 1/2003 | Seksaria et al. | |
| 6,672,648 B2 | 1/2004 | Heranney | |
| 6,688,671 B2 * | 2/2004 | Fukutomi | 296/146.6 |
| 2002/0024233 A1 | 2/2002 | Kleino | |

FOREIGN PATENT DOCUMENTS

| | | |
|---|---|---|
| DE | 4001947 | 8/1990 |
| JP | 57104468 | 6/1982 |
| JP | 9086171 | 3/1997 |
| JP | 2004009910 | 1/2004 |

* cited by examiner

*Primary Examiner*—Faye M. Fleming
(74) *Attorney, Agent, or Firm*—Plumsea Law Group, LLC

(57) ABSTRACT

An occupant safety system for a vehicle door is disclosed. The vehicle door includes a series of pads that help to absorb the force of a side impact collision. The pads cooperate to help push an occupant away from the door during the collision. This can help reduce injuries sustained by the occupant by increasing the available energy absorbing stroke.

20 Claims, 5 Drawing Sheets

OCCUPANT SAFETY DEVICE

BACKGROUND OF THE INVENTION

1. Field of the Invention

The present invention relates generally to the field of motor vehicles, and in particular to an occupant safety system for a motor vehicle.

2. Description of Related Art

Devices and systems that attempt to reduce occupant injury in the event of a collision have been proposed. In some cases, a soft padding material has been used to absorb energy and provide protection for the occupant. Often, the size of the padding material was increased to improve the level of occupant protection. U.S. Pat. No. 5,395,135 to Lim et al. is an example of such a system. The Lim et al. patent teaches various bolsters attached to the outer and inner walls of the door. In some embodiments, bolsters are attached only to the inner panel of the door. These embodiments can be seen in FIGS. 3 and 4.

A key feature of the Lim et al. patent is the arrangement of the bolsters with respect to door trim panel 38. Lim et al. provides a bolster that is attached to inner panel 18 and extends beyond door trim panel 38 and into the passenger compartment. Lim teaches the use of apertures or holes formed in door trim panel 38 that allow the bolsters 46 and 48 to extend into the passenger compartment. The '135 patent uses the term "protract" to describe this arrangement. See, for example, column 3, lines 42-45 of the Lim et al. patent: "The energy absorbing bolsters 46, 48 protract through the apertures 41, 42, respectively, in the door trim panel 38 and into the occupant compartment of the vehicle 12."

These systems, while possibly improving occupant protection, proved to be wide and cumbersome. The additional padding material also intruded into the passenger compartment, and reduced interior space.

Another source of occupant injury that has recently been discovered is injury caused by protruding objects. Occupants can be cut or injured by metal protruding into passenger cabin during a collision. The protruding metal is often broken, bent or twisted during a collision and this deformation of the metal can introduce sharp edges to the protruding metal objects. A system is needed that offers protection from sharp metal protruding into the passenger compartment.

U.S. Pat. No. 5,749,600 to Yamada et al. is directed to an energy absorbing door trim member. The '600 patent discloses a number of different embodiments. In one kind of embodiment, shown in FIGS. 4 to 8, the deflection of a portion of the door trim serves as an energy absorbing structure. Notice that in FIGS. 5, 7 and 8, a portion of the arm rest is deflected. In another embodiment, referred to in the specification as the fourth embodiment, one or more pads are used to help absorb energy. See column 7, line 41 to column 8, line 67; see also FIGS. 9 and 10. In all of these embodiments, Yamada is concerned with providing an energy absorbing device in the vicinity of an occupant's femur and below the illium (shown in the Figures as 18C) of the femur. While this arrangement may offer some protection against femur injury, it does little to prevent injury from protruding metal objects entering the passenger compartment during a collision.

There is currently a need for an occupant protection system that maintains a low profile and does not project into the passenger compartment and a system that is capable of displacing or moving occupant away from incoming metal objects.

SUMMARY OF THE INVENTION

An occupant safety system for a motor vehicle is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

The vehicle door includes a series of pads that help to absorb the force of a side impact collision. The series of pads maximizes the available energy absorbing stroke.

In one aspect, the invention provides a vehicle door comprising: an outer shell facing an exterior of the vehicle; a trim panel having an inner surface facing an interior of the vehicle and an outer surface facing an inner shell, the outer surface including an inner pad; an impact bar disposed proximate the outer shell, the impact bar including an outer pad associated with the impact bar; the inner shell being disposed between the outer shell and the trim panel; an intermediate pad disposed between the inner shell and the outer shell; and where the outer pad is configured to contact the intermediate pad during a side impact collision.

In another aspect, the intermediate pad is configured to contact the inner pad after the outer pad has contacted the intermediate pad.

In another aspect, the inner pad is configured to move the trim panel towards the interior of the vehicle and contact an occupant above the waist.

In another aspect, the inner pad is configured to contact the occupant's arm.

In another aspect, the inner pad is configured to contact the occupant's shoulder.

In another aspect, the trim panel moves further towards the interior of the vehicle than the impact bar in a collision.

In another aspect, at least one pad assists in moving the trim panel further towards the interior of the vehicle than the impact bar in a collision.

In another aspect, the invention provides a vehicle door comprising: an outer shell facing an exterior of the vehicle; a trim panel including an associated inner pad; an impact bar disposed proximate the outer shell; an inner shell disposed between the trim panel and the outer panel, the inner shell including a substantially vertical portion and a flange; and an intermediate pad associated with the inner shell, the intermediate pad including a projection configured to confront the substantially vertical portion and a hook configured to engage the flange.

In another aspect, the hook is disposed on a holder attached to a pad.

In another aspect, the intermediate pad includes a plurality of hooks.

In another aspect, the hooks are generally horizontally spaced.

In another aspect, the projection is disposed on a holder attached to a pad.

In another aspect, the projection is attached to the inner shell with a mechanical fastener.

In another aspect, the hook is also disposed on the holder and wherein the projection and the hook are integrally formed with the holder.

In another aspect, the invention provides a vehicle door comprising: an outer shell facing an exterior of the vehicle; a trim panel including an associated inner pad; an impact bar disposed proximate the outer shell, the impact bar including an outer pad associated with the impact bar; an inner shell disposed between the trim panel and the outer panel, and having an associated intermediate pad; and where the outer pad is configured to press the intermediate pad against the inner pad during a collision such that the trim panel moves further inward into an interior of the vehicle than the impact bar.

In another aspect, the trim panel is configured to push an occupant away from the impact bar during a collision.

In another aspect, the trim panel is configured to space an occupant from the impact bar during a collision.

In another aspect, the intermediate pad includes a holder configured to associate the intermediate pad with the inner shell, the holder being disposed on an inward side of the intermediate pad, and wherein the holder contacts the inner pad during a collision.

In another aspect, the outer pad, the intermediate pad and the inner pad are all substantially aligned.

In another aspect, the intermediate pad is disposed between the inner shell and the outer shell.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
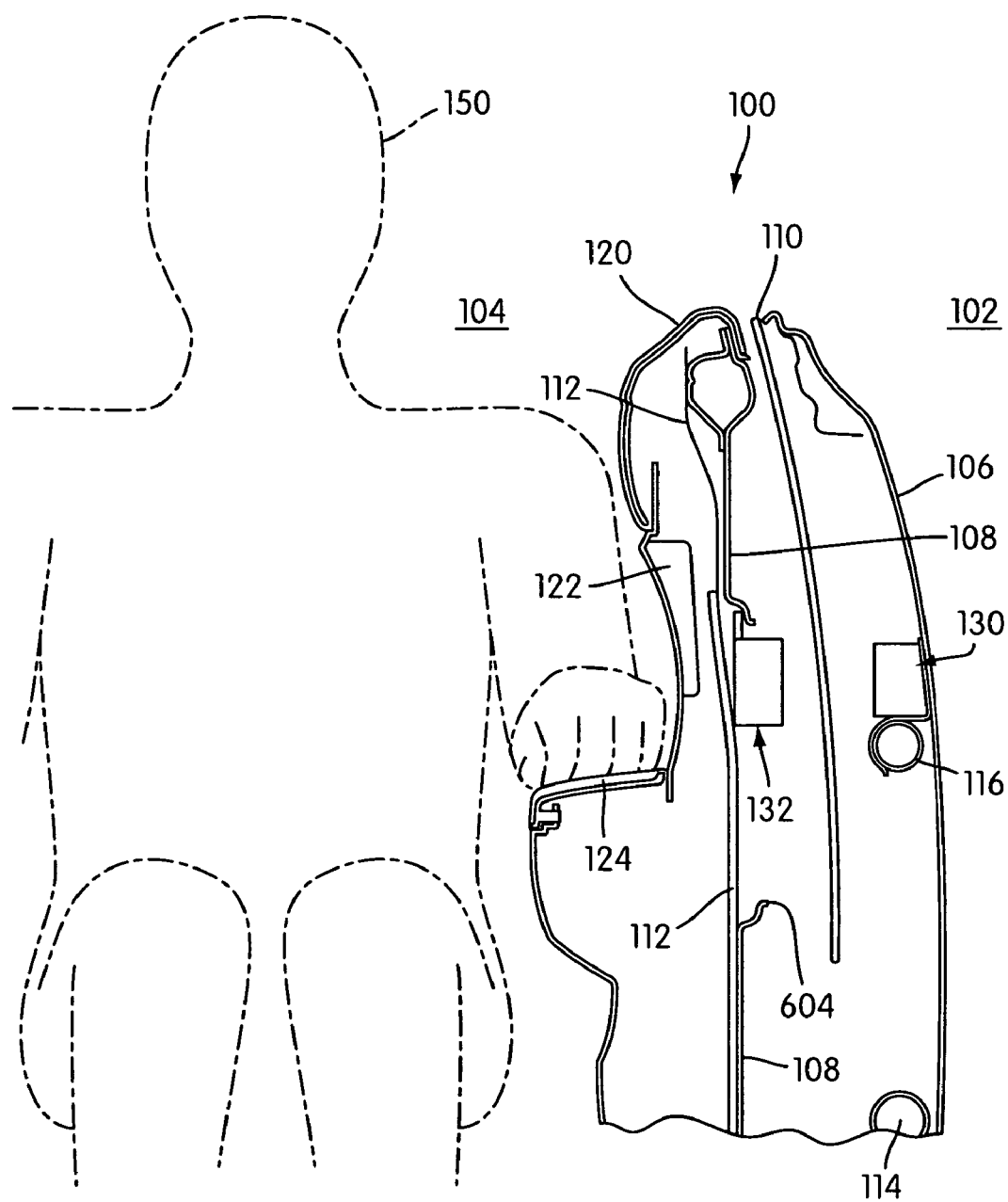
FIG. 1 is a cross-sectional view of a preferred embodiment of a door.

Embodiments of the present invention help to reduce occupant injury in the event of a collision. Preferably, one or more doors of a motor vehicle include provisions to prevent or reduce occupant injury in a collision. Referring to FIG. 1, which is a cross-sectional view of a preferred embodiment of a door 100, safety features can be provided inside door 100. Preferably, door 100 includes an outer shell 106 that faces exterior 102, and an inner shell 108 disposed towards interior 104. In some embodiments, outer shell 106 and inner shell 108 comprise the steel structure of door 100. In some embodiments, window 110 is disposed between outer shell 106 and inner shell 108. Window 110 is shown in the down position in the Figures. This is done to provide a better sense of the relative position of the various components. When reference is made to window 110 in this description, it is sometimes assumed that window 110 is in the down or lowered position. Of course, window 110 can also be raised to assume a closed or upward position, as well known in the art.

Some embodiments include an interior trim panel 120 that is associated with inner shell 108. Interior trim panel 120 faces interior 104 of the motor vehicle and provides a finish to door 100. In some embodiments, interior trim panel includes shoulder pad 122 disposed above arm rest 124. Preferably, arm rest 124 is intergrally molded with interior trim panel 120. Preferably, inner pad 122 includes an interior surface that is joined to interior trim panel 120 as shown in FIG. 1.

Preferably, inner pad 122 and arm rest 124 are designed with a driver 150 in mind. While this disclosure teaches an exemplary system and method for use with a driver, all of the principles, teachings and concepts are also applicable to any other occupant in a motor vehicle. Arm rest 124 is preferably located on trim panel 120 to naturally and comfortably receive the arm of driver 150. Preferably, inner pad 122 is located proximate the shoulder or arm area of driver 150.

To prevent intrusion by foreign objects during a side impact collision, some embodiments of door 100 can include a lower side impact bar 114 and/or an upper side impact bar 116. Lower side impact bar 114 is optional and is omitted in some embodiments. In the embodiment shown in FIG. 1, door 100 includes an outer pad 130 disposed near upper side impact bar 116. Some embodiments can include an intermediate pad 132 disposed between window slot 112 and inner shell 108.

Preferably, outer pad 130 is disposed interior of outer shell 106 but exterior of window 110. In other words, outer pad 130 is preferably disposed between outer shell 106 and window 110. Preferably, outer pad 130 is generally aligned with at least a portion of intermediate pad 132. In some embodiments, intermediate pad 132 is also aligned with inner pad 122. This aligned pad arrangement can be particularly helpful in a collision, as described below.

Figure 2:
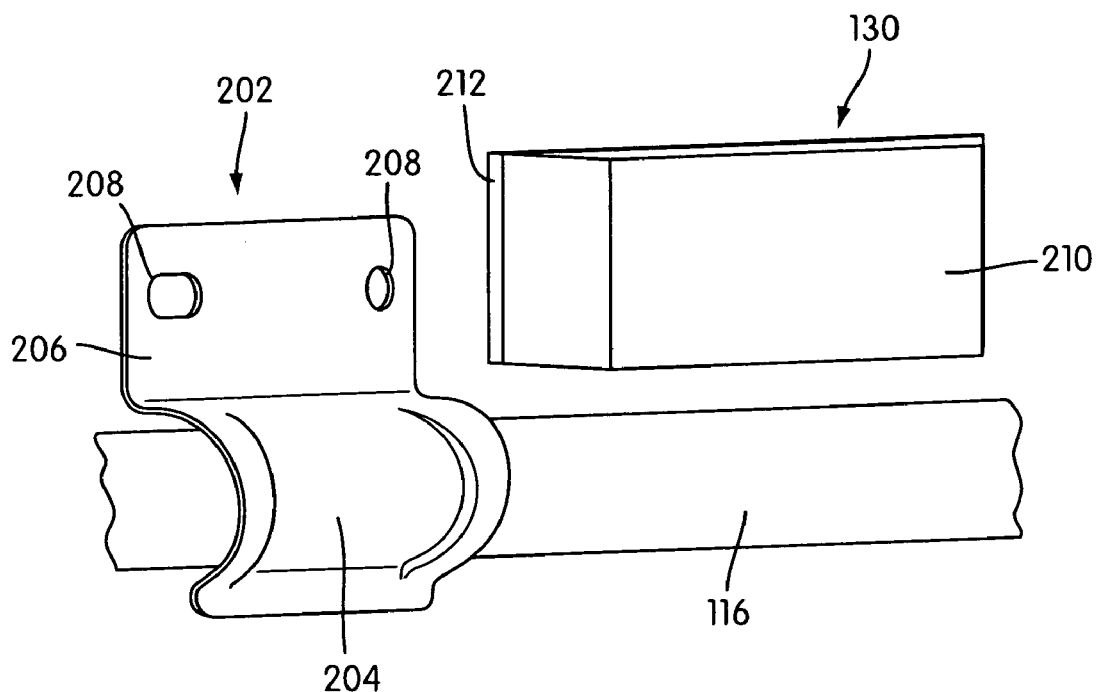
FIG. 2 is an exploded view of a preferred embodiment of an outer pad.
Figure 3:
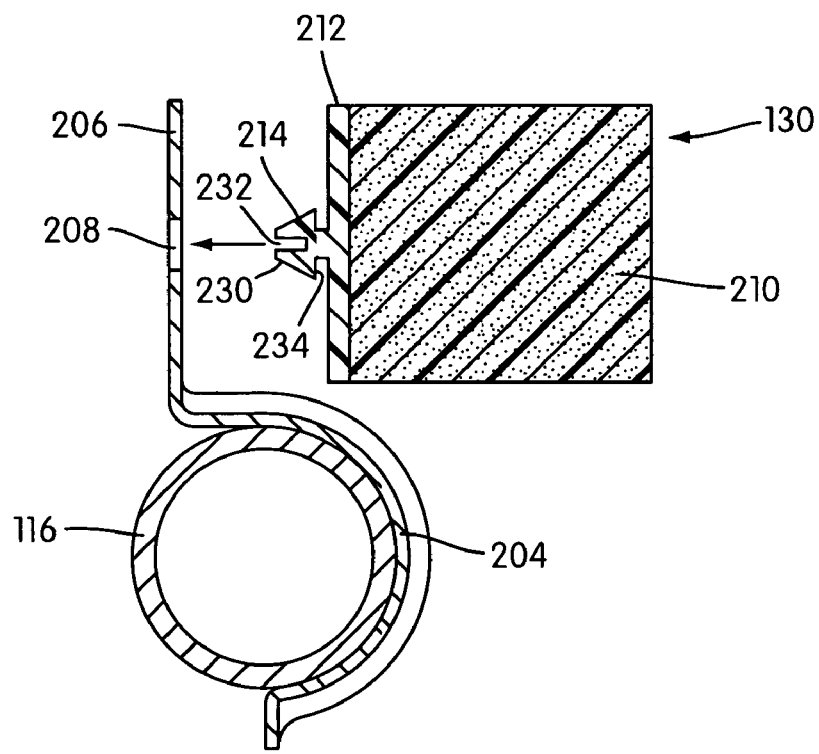
FIG. 3 is a cross-sectional view of a preferred embodiment of an outer pad.

Outer pad 130 can be placed near upper side impact bar 116 in a variety of different ways. In some embodiments, outer pad 130 is attached to outer shell 106, while in other embodiments, outer pad 130 is mounted to upper side impact bar 116. FIGS. 2 and 3 show a preferred embodiment of a mounting system for outer pad 130. Referring to FIGS. 2 and 3, outer pad 130 preferably comprises foam pad 210 and backing 212. Preferably, foam pad 210 is attached to backing 212, which is preferably made of a rigid material. In an exemplary embodiment, backing 212 is made of a durable plastic.

The composite outer pad 130 is preferably attached to a bracket 202 associated with upper side impact bar 116. In the preferred embodiment shown in FIGS. 2 and 3, bracket 202 includes a mounting portion 204 and an engaging portion 206. Mounting portion 204 is preferably designed to correspond to the shape of side impact bar 116. In the exemplary embodiment shown in FIG. 2, upper side impact bar 116 has a generally round shape. Thus, in the embodiment shown in FIGS. 2 and 3, bracket 202 preferably includes a mounting portion 204 with a corresponding round shape. Mounting portion 204 can be attached to upper side impact bar 116 in a number of different ways. Some possibilities include using an adhesive or mechanical fasteners to join the two parts together. However, in a preferred embodiment, mounting portion 204 is attached to upper side impact bar 116 by welding the two components together.

Engaging portion 206 is preferably designed to associate outer pad 130 with bracket 202 and ultimately with upper side impact bar 116. Many different devices or fasteners can be used to associate outer pad 130 with engaging portion 206. In the preferred embodiment shown in FIGS. 2 and 3, a clip or anchoring system is used. As shown in FIGS. 2 and 3, engaging portion 206 includes at least one hole 208. In an exemplary embodiment, engaging portion 206 includes a pair of horizontally-spaced holes 208. Backing 212 of outer pad 130 includes a corresponding number of clips 214.

As shown in FIG. 3, clip 214 is designed to engage and enter hole 208. Preferably, clip 214 includes a forward penetrating portion 230 with a slot 232. As clip 214 enters hole 208, the taper of penetrating portion 230 forces penetrating portion 230 to contract to fit inside hole 208. Slot 232 permits penetrating portion 230 to deform to enter hole 208. After penetrating portion 230 emerges on the other side of engaging portion 206, backing 212 embraces engaging portion 206 on one side and shoulder 234 contacts engaging portion 206 in the opposite side. Using this arrangement, outer pad 130 is associated with upper impact bar 116.

Figure 4:
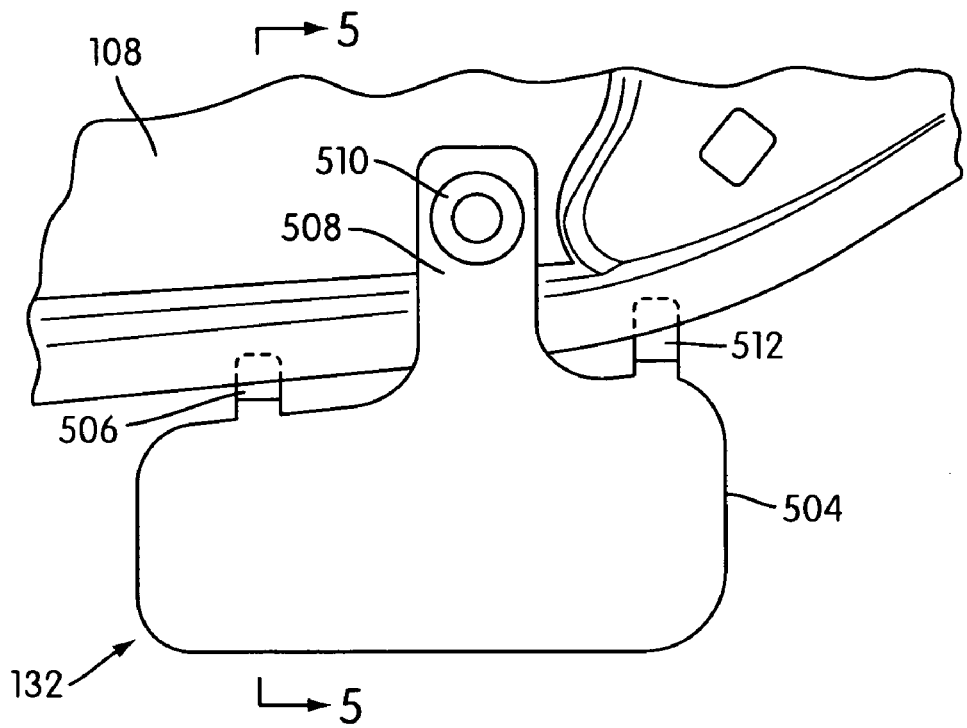
FIG. 4 is a front view of a preferred embodiment of an intermediate pad.
Figure 5:
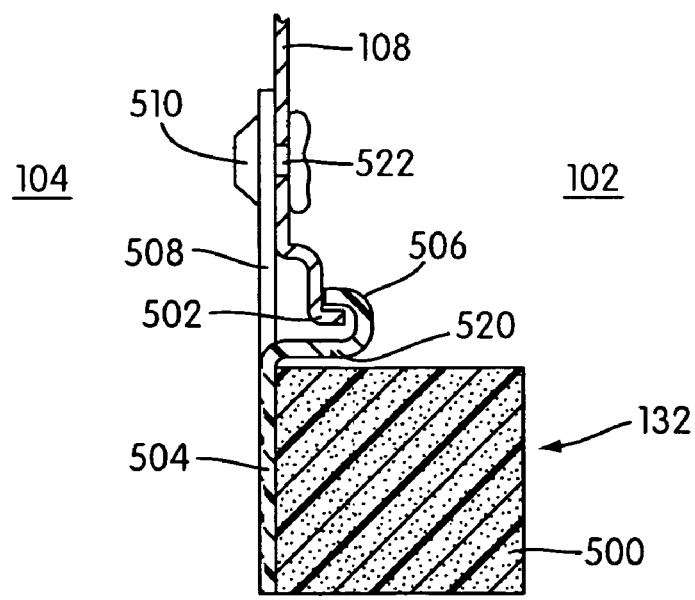
FIG. 5 is a cross-sectional view of a preferred embodiment of an intermediate pad.

As noted above, intermediate pad 132 is generally aligned with at least a portion of outer pad 130. Many different systems can be used to place intermediate pad 132 between window 110 and inner shell 108, and in a position that is generally aligned with outer pad 130. FIGS. 4 and 5 show a preferred embodiment of a system for placing intermediate pad 132 in the desired location. Referring to FIGS. 4 and 5, intermediate pad 132 comprises foam pad 500 and pad holder 504. Preferably, foam pad 500 is securely attached to pad holder 504. Holder 504 is preferably disposed on the interior side of foam pad 500. However, holder 504 includes an upper portion 520 that extends in an exterior direction from the interior side of foam pad 500. In the preferred embodiment shown in FIG. 5, a hook 506 extends upwards from upper portion 520.

Inner shell 108 extends generally vertically downward and includes a flange 502 that extends in a direction that is generally exterior of inner shell 108. In the embodiment shown in FIGS. 4 and 5, hook 506 is designed to engage flange 502. Hook 506 includes a generally vertical portion and a portion that extends in an interior direction, hook 506 generally forms a pocket that receives flange 502.

Preferably, intermediate pad 132 also includes a projection 508 that extends upwards towards inner shell 108. Preferably, projection 508 is disposed on the opposite side of inner shell 108 as hook 506. In the embodiment shown in FIGS. 4 and 5, projection 508 is disposed on the interior side of inner shell 108 and hook 506 is disposed on the exterior side of inner shell 108. Preferably, projection 508 includes a mechanical fastener 510 that attaches projection 508 to inner shell 108. Preferably, mechanical fastener 510 is attached on a vertical portion of inner shell 108. In a preferred embodiment, mechanical fastener 510 includes a pin and grommet arrangement. A grommet is placed on projection 508 and is inserted through the grommet and through a hole 522 in inner shell 108. In some embodiments, a second hook 512 is also used to help secure intermediate pad 132 to inner shell 108. In the exemplary embodiment shown in FIG. 4, second hook 512 is horizontally spaced from first hook 506 and is designed similarly to first hook 506.

Figure 6:
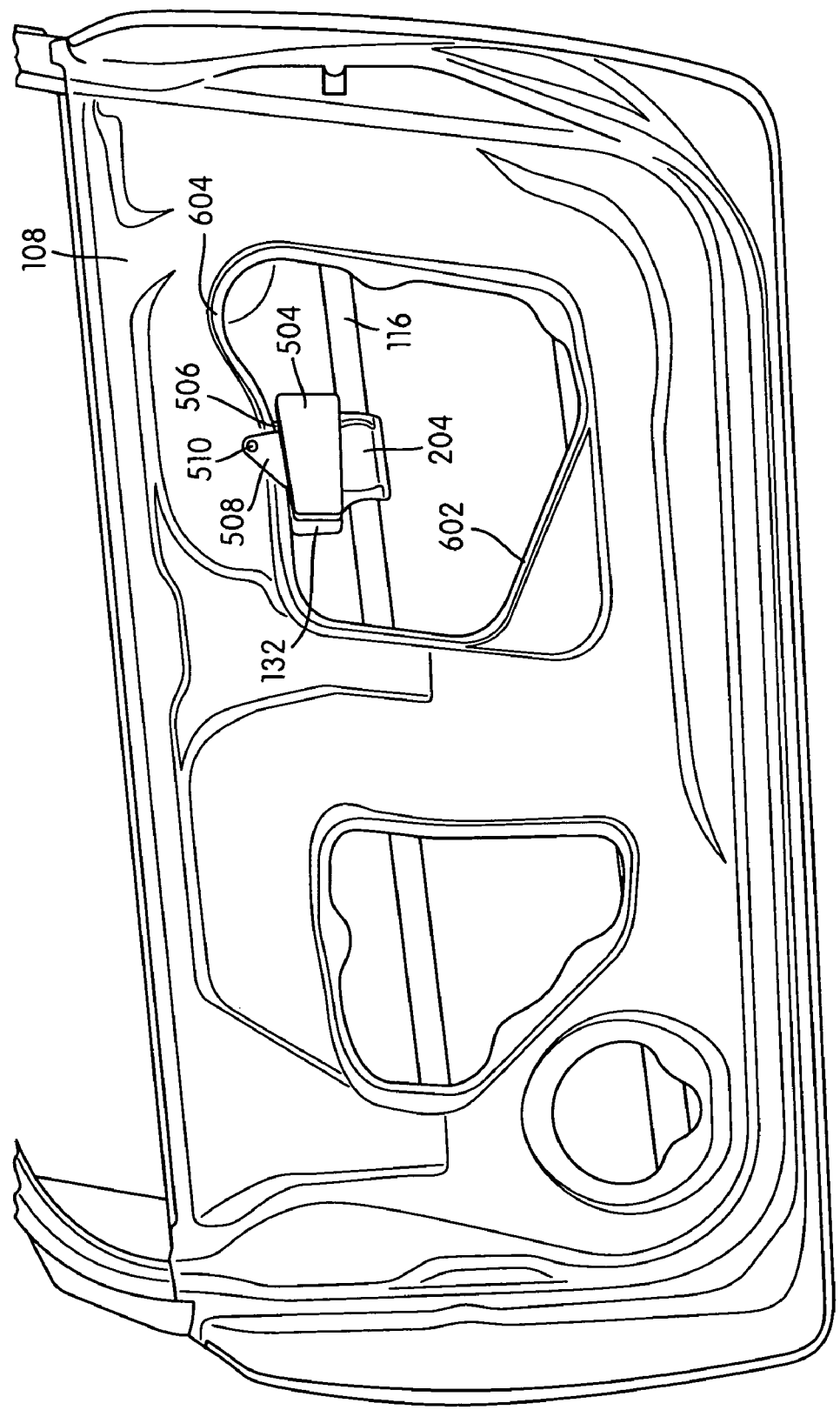
FIG. 6 is a schematic diagram of a preferred embodiment of an inner shell.

FIG. 6 is an exposed view of door 100. In FIG. 6, trim panel 120 has been removed. In the embodiment shown in FIG. 6, inner shell 108 includes a shell hole 602. The upper portion 604 of shell hole 602 includes flange 502 (see FIG. 5). As disclosed above, intermediate pad 132 can be attached to inner shell 108 by using an assembly designed to engage flange 502.

In FIG. 6, the alignment of outer pad 130 and intermediate pad 132 can be observed. In some embodiments, only a portion of outer pad 130 is aligned with intermediate pad 132, however, in the preferred embodiment shown in FIG. 6, the entirety of outer pad 130 is almost completely aligned with the entirety of intermediate pad 132. This arrangement can maximize the effectiveness of the safety system. Because of their alignment and their respective positions, the outer and intermediate pads 130 and 132 produce a pad system that can provide additional energy absorbing stoke during a collision.

Figure 7:
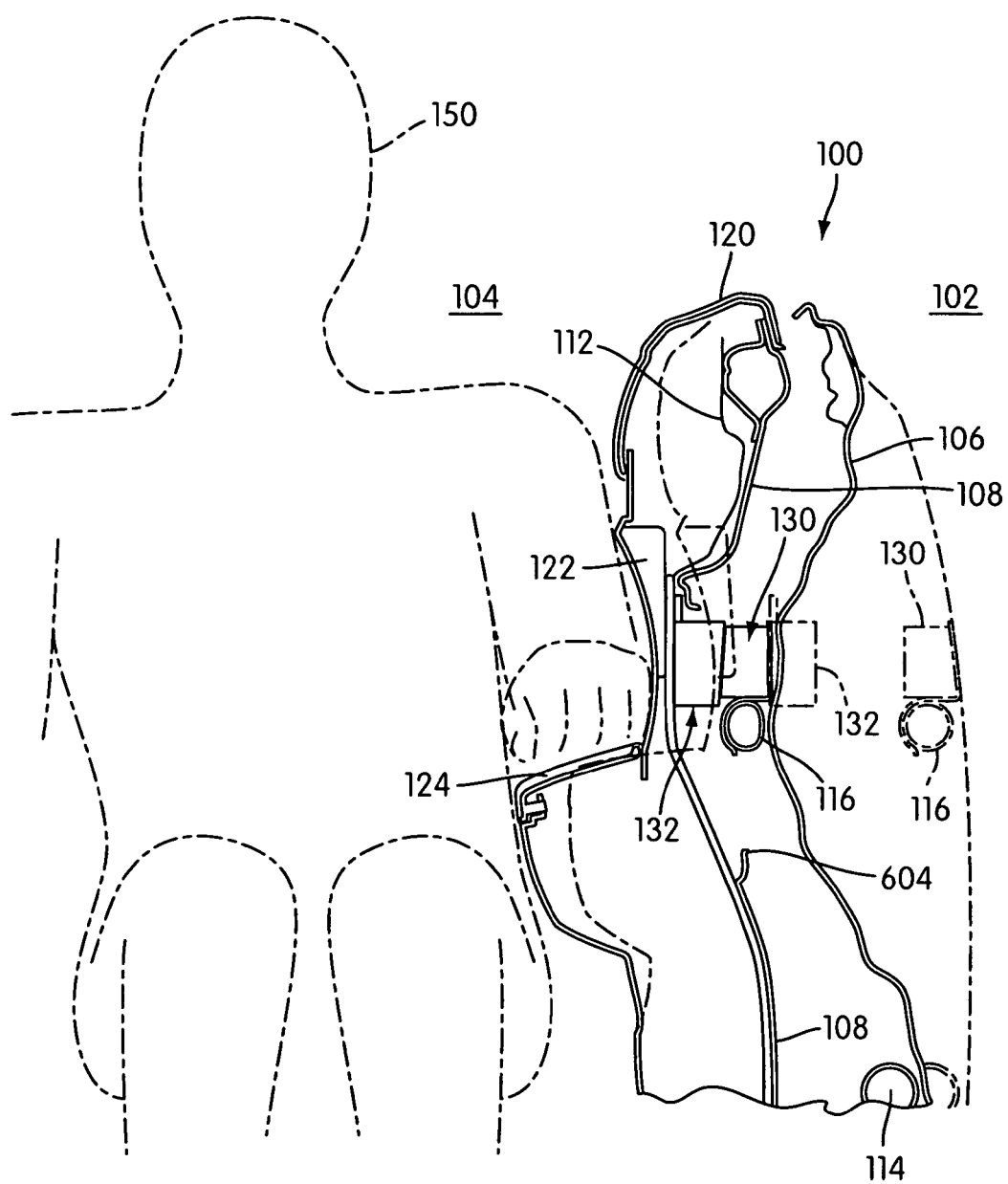
FIG. 7 is a cross-sectional view of a preferred embodiment of a door after a collision.

FIG. 7 is a cross-sectional view of a preferred embodiment of door 100 in a post-impact condition. The force of the impact causes upper side impact bar 116 to move towards interior 104 of the motor vehicle. As upper side impact bar 116 moves towards interior 104, outer pad 130 also moves towards interior 104. Upper side impact bar 116 travels past window 110 and eventually, outer pad 130 contacts at least a portion of intermediate pad 132. After the two pads make contact, side impact bar 116 continues to move towards interior 104 and the two pads 130 and 132 move together and eventually make contact with inner pad 122. In some embodiments, side impact airbags may deploy if the collision is severe enough. As the collision continues, inner pad 122 makes contact with driver 150 via trim panel 120 and pushes driver towards the interior 104.

In some embodiments, the force of the collision is so great that the pads are unable to push the driver towards interior 104. Rather, in those cases, the pads help driver 150 maintain his or her position or the pads help to space driver 150 from upper side impact bar 116 or inner shell 108.

Through the use of the disclosed pad arrangement, occupant injury can be reduced by providing additional energy absorbing stroke. Also, the arrangement of the pads and their particular location at shoulder height help to ensure that the widest part of driver 150 is pressed inwards towards interior 104. Other pad devices or systems disposed at hip or leg level may not accomplish this spacing function, because those pad systems or devices are not disposed at or near shoulder level.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A vehicle door comprising:
   an outer shell facing an exterior of the vehicle;
   a trim panel having an inner surface facing an interior of the vehicle and an outer surface facing an inner shell, the outer surface including an inner pad;

an impact bar disposed proximate the outer shell, the impact bar including an outer pad associated with the impact bar;

the inner shell being disposed between the outer shell and the trim panel;

an intermediate pad disposed between the inner shell and the outer shell; and wherein the outer pad is configured to contact the intermediate pad during a side impact collision.

2. The vehicle door according to claim 1, wherein the intermediate pad is configured to contact the inner pad after the outer pad has contacted the intermediate pad.

3. The vehicle door according to claim 1, wherein the inner pad is configured to move the trim panel towards the interior of the vehicle and contact an occupant above the waist.

4. The vehicle door according to claim 3, wherein the inner pad is configured to contact the occupant's arm.

5. The vehicle door according to claim 3, wherein the inner pad is configured to contact the occupant's shoulder.

6. The vehicle door according to claim 1, wherein the trim panel moves further towards the interior of the vehicle than the impact bar in a collision.

7. The vehicle door according to claim 6, wherein at least one pad assists in moving the trim panel further towards the interior of the vehicle than the impact bar in a collision.

8. A vehicle door comprising:
an outer shell facing an exterior of the vehicle;
a trim panel including an associated inner pad;
an impact bar disposed proximate the outer shell;
an inner shell disposed between the trim panel and the outer panel, the inner shell including a substantially vertical portion and a flange; and
an intermediate pad associated with the inner shell, the intermediate pad including a projection configured to confront the substantially vertical portion and a hook configured to engage the flange.

9. The vehicle door according to claim 8, wherein the hook is disposed on a holder attached to a pad.

10. The vehicle door according to claim 8, wherein the intermediate pad includes a plurality of hooks.

11. The vehicle door according to claim 10, wherein the hooks are generally horizontally spaced.

12. The vehicle door according to claim 8, wherein the projection is disposed on a holder attached to a pad.

13. The vehicle door according to claim 12, wherein the projection is attached to the inner shell with a mechanical fastener.

14. The vehicle door according to claim 12, wherein the hook is also disposed on the holder and wherein the projection and the hook are integrally formed with the holder.

15. A vehicle door comprising:
an outer shell facing an exterior of the vehicle;
a trim panel including an associated inner pad;
an impact bar disposed proximate the outer shell, the impact bar including an outer pad associated with the impact bar;
an inner shell disposed between the trim panel and the outer panel, and having an associated intermediate pad; and
wherein the outer pad is configured to press the intermediate pad against the inner pad during a collision such that the trim panel moves further inward into an interior of the vehicle than the impact bar.

16. The vehicle door according to claim 15, wherein the trim panel is configured to push an occupant away from the impact bar during a collision.

17. The vehicle door according to claim 15, wherein the trim panel is configured to space an occupant from the impact bar during a collision.

18. The vehicle door according to claim 15, wherein the intermediate pad includes a holder configured to associate the intermediate pad with the inner shell, the holder being disposed on an inward side of the intermediate pad, and wherein the holder contacts the inner pad during a collision.

19. The vehicle door according to claim 15, the intermediate pad and the inner pad are all substantially aligned.

20. The vehicle door according to claim 15, wherein the intermediate pad is disposed between the inner shell and the outer shell.

* * * * *